United States Patent
Kudo

(10) Patent No.: US 11,984,606 B2
(45) Date of Patent: May 14, 2024

(54) ROLLED COPPER FOIL FOR LITHIUM ION BATTERY CURRENT COLLECTOR, AND LITHIUM ION BATTERY

(71) Applicant: JX Nippon Mining & Metals Corporation, Tokyo (JP)

(72) Inventor: Katsuhiro Kudo, Kanagawa (JP)

(73) Assignee: JX Metals Corporation, Tokyo (JP)

( * ) Notice: Subject to any disclaimer, the term of this patent is extended or adjusted under 35 U.S.C. 154(b) by 502 days.

(21) Appl. No.: 17/289,622

(22) PCT Filed: Aug. 22, 2019

(86) PCT No.: PCT/JP2019/032905
§ 371 (c)(1),
(2) Date: Apr. 28, 2021

(87) PCT Pub. No.: WO2020/090195
PCT Pub. Date: May 7, 2020

(65) Prior Publication Data
US 2021/0399309 A1  Dec. 23, 2021

(30) Foreign Application Priority Data
Oct. 29, 2018 (JP) .................. 2018-203231

(51) Int. Cl.
*H01M 4/66* (2006.01)
*B21B 1/40* (2006.01)
(Continued)

(52) U.S. Cl.
CPC ........... *H01M 4/667* (2013.01); *H01M 4/661* (2013.01); *H01M 10/0525* (2013.01); *B21B 1/40* (2013.01);
(Continued)

(58) Field of Classification Search
CPC .. H01M 4/661; H01M 4/667; H01M 10/0525; B21B 1/40
See application file for complete search history.

(56) References Cited

U.S. PATENT DOCUMENTS

| 7,195,842 | B1 | 3/2007 | Fujimoto et al. |
| 9,647,272 | B1 * | 5/2017 | Cheng .................. C25D 7/0614 |
| 2018/0327085 | A1 | 11/2018 | Argiolas et al. |

FOREIGN PATENT DOCUMENTS

| JP | 10212562 A | 8/1998 |
| JP | 3733067 B2 | 10/2005 |

(Continued)

OTHER PUBLICATIONS

Translation of the International Preliminary Report on Patentability for PCT/JP2019/032905 dated Apr. 27, 2021, 8 pages.
(Continued)

*Primary Examiner* — Karie O'Neill Apicella
(74) *Attorney, Agent, or Firm* — Faegre Drinker Biddle & Reath LLP

(57) ABSTRACT

Provided is a rolled copper foil for a lithium ion battery current collector, which has good adhesion to a negative electrode active material, generates less metal powder during ultrasonic welding, and has a rust prevention property. In the rolled copper foil for a lithium ion battery current collector, a surface of the copper foil has a BTA film, the BTA film has a thickness of 0.6 nm or more and 4.6 nm or less, and the rolled copper foil satisfies the following relationships: 40≤wet tension [mN/m]+thickness of BTA film [nm]×10≤80; 0.01≤arithmetic average roughness Ra [μm] ≤0.25; and wet tension [mN/m]≥35.

10 Claims, 3 Drawing Sheets

(51) Int. Cl.
   *B21B 3/00* (2006.01)
   *H01M 4/02* (2006.01)
   *H01M 10/0525* (2010.01)

(52) U.S. Cl.
   CPC . *B21B 2003/005* (2013.01); *H01M 2004/027* (2013.01)

(56) References Cited

FOREIGN PATENT DOCUMENTS

| | | | |
|---|---|---|---|
| JP | 2007305322 | A | 11/2007 |
| JP | 2008159297 | A | 7/2008 |
| JP | 2008184657 | A | 8/2008 |
| JP | 2011134651 | A | 7/2011 |
| JP | 201721888 | A | 1/2017 |
| JP | 2017186649 | A | 10/2017 |
| JP | 2018203231 | A | 12/2018 |
| WO | 2011030626 | A1 | 3/2011 |
| WO | 2011055680 | A1 | 12/2011 |
| WO | 2014178327 | A1 | 6/2014 |
| WO | WO-2014178327 | A1 * | 11/2014 ............ H01M 4/661 |

OTHER PUBLICATIONS

JP International Search Report for PCT/JP2019/032905 dated Nov. 19, 2019, 4 pages.

* cited by examiner

ROLLED COPPER FOIL FOR LITHIUM ION BATTERY CURRENT COLLECTOR, AND LITHIUM ION BATTERY

FIELD OF THE INVENTION

The present invention relates to a rolled copper foil for a lithium ion battery current collector, and a lithium ion battery.

BACKGROUND OF THE INVENTION

Lithium ion batteries have features of having higher energy density and being able to obtain a relatively high voltage, and are widely used for small electronic devices such as notebook computers, video cameras, digital cameras, and mobile phones. In the future, they are expected to be used as power sources for large devices such as electric vehicles and distributed power sources for general households.

FIG. 1 is a schematic view of a stack structure of a lithium ion battery. An electrode body of the lithium ion battery generally has a stack structure in which large numbers of positive electrodes 11, separators 12, and negative electrodes 13 are wound or laminated. Typically, the positive electrode is composed of a positive electrode current collector made of aluminum foil and a positive electrode active material made of a lithium composite oxide such as $LiCoO_2$, $LiNiO_2$ and $LiMn_2O_4$ provided on a surface of the current collector, and the negative electrode is composed of a negative electrode current collector made of a copper foil and a negative electrode active material made of carbon or the like provided on a surface of the current collector. The positive electrodes 11 and the negative electrodes 13 are welded to each other at tabs 14 and 15, respectively. Further, the positive electrode 11 and the negative electrode 13 are connected to tab terminals made of aluminum or nickel, and the connection is also carried out by welding. The welding is generally carried out by ultrasonic welding.

Characteristics required for the copper foil used as the current collector of the negative electrode include adhesion to the negative electrode active material and decreased generation of metal powder during ultrasonic welding.

A general method for improving the adhesion to the active material layer includes a surface processing for forming irregularities on the copper foil surface in advance, which is called a roughening process. Known as a method for the roughening process are blasting, rolling with a rough surface roll, mechanical polishing, electrolytic polishing, chemical polishing, plating of electrodeposited grains, and the like. Among these, the plating of the electrodeposited grains is often used. This technique is carried out by electrodepositing a large number of dendritic or small spherical coppers on the surface of the copper foil by using a copper sulfate acidic plating bath to form fine irregularities, thereby improving adhesion due to an anchoring effect, or concentrating stress on recesses of an active material layer to form cracks during expansion of the active material having larger volume changes, thereby avoiding peeling due to stress concentrated at current corrector boundaries (for example, Japanese Patent No. 3733067 B (Patent Literature 1)).

Further, in the copper foil used as the current collector of the lithium ion battery, the Li active material is applied to the surface of the copper foil. In this case, the active material may be thickly applied in order to increase a capacity of the battery. However, the thickly applying of the active material may cause a problem in relation to adhesion of the copper foil to the active material, such as peeling of the active material. Further, the use of Si-based active material has been studied as another means for increasing the capacity of the battery. However, the Si-based active material has a higher expansion and contraction rate than that of the existing material, which may cause a problem in relation to the adhesion.

Further, the copper foil used as the current collector of the lithium ion battery may peel off into powder during ultrasonic welding to generate metal powder. If a large amount of such metal powder is generated to remain on the electrode body, an internal short circuit or the like may occur to deteriorate the performance of the lithium ion battery. As a method for suppressing the generation of metal powder, for example, Japanese Patent Application Publication No. 2007-305322 A (Patent Literature 2) discloses that an internal strain of a current collector of a negative electrode is removed by annealing and softened, thereby preventing a part of the current collector from peeling in the form of powder during ultrasonic welding to decrease residual metal powder having 50 μm or more.

Further, a factor for determining a battery life of a lithium ion secondary battery includes adhesion at a boundary between a current collector and an active material layer. Most of the lithium ion batteries currently on the market employ negative electrodes prepared by applying a slurry obtained by mixing an active material, a binder, and an organic solvent onto a copper foil that will serve as the current collector, and then drying it. If the slurry cannot be uniformly wetted and spread on the surface of the current collector, it causes peeling of the active material and the like, which is not desirable. Therefore, wettability (wet tension) of the electrode surface is also important. For example, as a method of preventing copper foils laminated and polymerized in a wound product (coil) of a copper foil obtained by cold rolling from adhering to each other, Japanese Patent Application Publication No. H10-212562 A (Patent Literature 3) discloses a final annealing method of a copper foil wound product by washing a surface of the copper foil before being wound to remove fine powder of copper adhering to the surface of the copper foil, and also decreasing a content of a residual oil such as rolling oil remaining on the surface to a predetermined value or less, and then winding up the copper foil.

As a method for improving a rust prevention property, a method of chromate treatment or silane coupling treatment on the surface of the copper foil is known in the art. The silane coupling treatment also has an effect of improving adhesion. For example, Japanese Patent Application Publication No. 2008-184657 A (Patent Literature 4) discloses that a barrier layer formed from a metal selected from at least one of nickel, cobalt, tungsten, and molybdenum, or these metals and phosphorous, a metalloid metal, or boron, is formed on at least one surface of a copper foil, and the formed barrier layer is then subjected to a chromate treatment using trivalent chromium as a chromium source, and the resulting trivalent chromium coating is subjected to the silane coupling treatment, thereby resulting in improved adhesion and rust prevention. It also discloses that the silane coupling treatment is carried out under conditions where a concentration of a silane coupling agent is 0.5 mL/L or more and 10 mL/L or less, and after immersion at a liquid temperature of 30° C. for 5 seconds, the silane coupling agent is immediately removed from a treatment solution and dried.

Further, as a method for improving rust prevention and adhesion to an active material, Japanese Patent Application Publication No. 2011-134651 A (Patent Literature 5) discloses a method for applying a triazole compound solution onto a copper foil. Benzotriazole (BTA), which is one of triazole compounds, reacts with monovalent copper oxide by the following reaction:

to form a three-dimensional polymer film having about several tens of Å, which exhibits higher moisture resistance and rust resistance.

CITATION LIST

Patent Literatures

[Patent Literature 1] Japanese Patent No. 3733067 B
[Patent Literature 2] Japanese Patent Application Publication No. 2007-305322 A
[Patent Literature 3] Japanese Patent Application Publication No. H10-212562 A
[Patent Literature 4] Japanese Patent Application Publication No. 2008-184657 A
[Patent Literature 4] Japanese Patent Application Publication No. 2011-134651 A

SUMMARY OF THE INVENTION

Technical Problem

Thus, technological developments have been made to improve the characteristics of the copper foil used as the current collector of the lithium ion battery. However, there is still a need for development of techniques for achieving both improvement of adhesion to an active material and suppression of generation of metal powder during ultrasonic welding, while improving rust prevention properties.

Therefore, the present disclosure provides a rolled copper foil for a lithium ion battery current collector, which has good adhesion to a negative electrode active material, generates less metal powder during ultrasonic welding, and has a rust prevention property.

Solution to Problem

As a result of repeated studies to solve the above problems, the present inventors have found that a rolled copper foil for a lithium ion battery current collector, which has good adhesion to a negative electrode active material, generates less metal powder during ultrasonic welding, and has a rust prevention property, can be provided by controlling a relationship between a thickness and a wet tension of a benzotriazole film (hereinafter referred to as a "BTA film") of a rolled copper foil, and further controlling a numerical range of an arithmetic average roughness Ra.

As used herein, the thickness of the BTA film refers to a value obtained by subjecting a rolled copper foil for negative electrode current collectors of lithium ion batteries in which at least a part of the surface of the copper foil is covered with BTA, to an elemental analysis in a depth direction of the copper foil by an XPS device while subjecting the copper foil to argon sputtering, determining a sputtering time when a nitrogen concentration is an intermediate value between the maximum value on the surface and a value in a non-BTA coated portion, regarding this time as a time required for sputtering the BTA film, and multiplying the time by a sputtering rate (converted to $SiO_2$).

In one aspect, an embodiment of the present invention that has completed based on the above findings relates to a rolled copper foil for a lithium ion battery current collector, wherein a surface of the copper foil has a BTA film, the BTA film has a thickness of 0.6 nm or more and 4.6 nm or less, and wherein the rolled copper foil satisfies the following relationships: 40≤wet tension [mN/m]+thickness of BTA film [nm]×10≤80; 0.01≤arithmetic average roughness Ra [μm]≤0.25; and wet tension [mN/m]≥35.

In an embodiment, the rolled copper foil for a lithium ion battery current collector according to the embodiment of the present invention satisfies: 45≤wet tension [mN/m]+thickness of BTA film [nm]×10≤75; and wet tension [mN/m]≥39.

In another embodiment, the rolled copper foil for a lithium ion battery current collector according to the embodiment of the present invention satisfies an arithmetic average roughness Ra [μm]≥0.03.

In still another embodiment, the rolled copper foil for a lithium ion battery current collector according to an embodiment of the present invention is for a negative electrode current collector of a lithium ion secondary battery.

In another aspect, an embodiment of the present invention relates to a lithium ion battery comprising the rolled copper foil for a lithium ion battery current collector according to the present invention as a current collector.

Advantageous Effects of Invention

According to the present invention, it is possible to provide a rolled copper foil for a lithium ion battery current collector, which has good adhesion to a negative electrode active material, generates less metal powder during ultrasonic welding, and has a rust prevention property.

Figure 1:
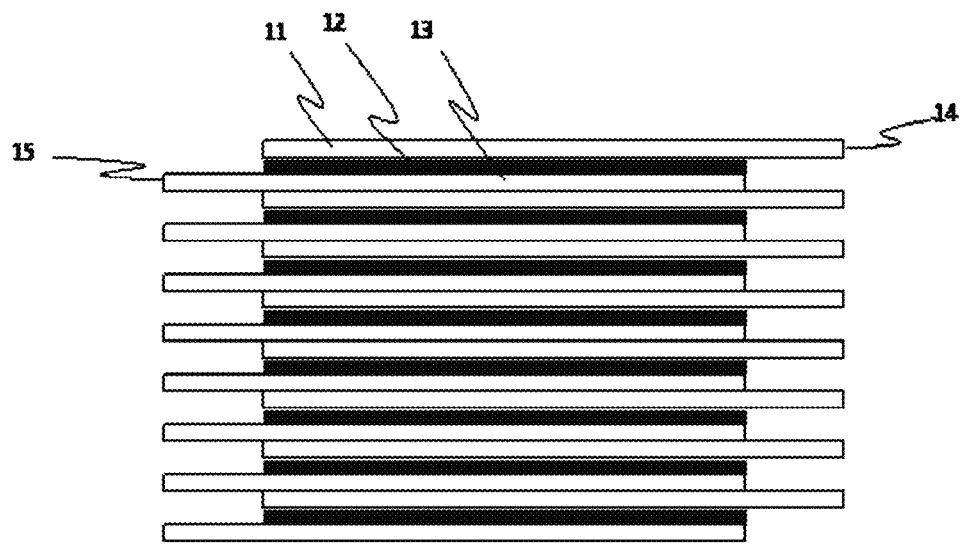
FIG. 1 is a schematic view of a stack structure of a lithium ion battery according to an embodiment of the present invention.

DETAILED DESCRIPTION OF THE INVENTION (Rolled Copper Foil for Lithium Ion Battery Current Collector)

A copper foil substrate of a rolled copper foil for a lithium ion battery current collector according to an embodiment of the present invention employs a rolled copper foil. It is to understand that the rolled copper foil also include a rolled copper alloy foil. A material of the rolled copper foil is not particularly limited and it may be appropriately selected depending on applications and required characteristics. Non-limiting examples include copper alloys such as high-purity copper (oxygen-free copper, tough pitch copper, etc.), Sn-containing copper, Ag-containing copper, Cu—Ni—Si-based copper alloy doped with Ni, Si or the like, Cu—Cr—Zr-based copper alloy doped with Cr, Zr or the like.

A thickness of the rolled copper foil is not particularly limited, and it may be appropriately selected according to required characteristics. In general, it is from 1 to 100 μm, but when the rolled copper foil is used as a current collector for negative electrodes of lithium ion secondary batteries, a lower thickness of the rolled copper foil can lead to a battery having a higher capacity. From such a viewpoint, the thickness may typically be from about 2 to 50 µm, and more typically about 5 to 20 µm.

The rolled copper foil for a lithium ion battery current collector according to an embodiment of the present invention has a BTA film on the surface, and the BTA film has a thickness of 0.6 nm or more and 4.6 nm or less, and the rolled copper foil satisfies the following relationships: 40≤wet tension [mN/m]+thickness of BTA film [nm]×10≤80; 0.01≤arithmetic average roughness Ra [µm]≤0.25; and wet tension [mN/m]≥35. By thus controlling the relationship between the wet tension of the rolled copper foil and the thickness of the BTA film, and the arithmetic average roughness Ra of the copper foil, it is possible to obtain a rolled copper foil for a lithium ion battery current collector, which has good adhesion to the active material and generates less metal powder during ultrasonic welding.

The rolled copper foil for the lithium ion battery current collectors preferably satisfies 45≤wet tension [mN/m]+thickness of BTA film [nm]×10≤75, and 50≤wet tension [mN/m]+thickness of BTA film [nm]×10≤70, and more preferably 55≤wet tension [mN/m]+thickness of BTA film [nm]×10≤65.

The rolled copper foil for a lithium ion battery current collector according to an embodiment of the present invention satisfies 0.01≤arithmetic average roughness Ra [µm] ≤0.25. If the arithmetic average roughness Ra is less than 0.01 µm, an anchor effect may be reduced and adhesion to the negative electrode active material may be deteriorated. Further, if the arithmetic average roughness Ra is more than 0.25 µm, there are many oil pits on the surface of the copper foil, and a rolling oil penetrates into them, which makes it difficult to remove the rolling oil, and an amount metal powder is significantly increased during ultrasonic welding. An increased residual oil content on the copper foil surface tends to deteriorate the wet tension.

The rolled copper foil for a lithium ion battery current collector according to an embodiment of the present invention satisfies 0.01≤arithmetic average roughness Ra [µm] ≤0.2 in one embodiment, and 0.03≤arithmetic average roughness Ra [µm]≤0.15 in another embodiment, and 0.05≤arithmetic average roughness Ra [µm]≤0.1 in yet another embodiment.

The rolled copper foil for a lithium ion battery current collector according to an embodiment of the present invention satisfies a wet tension [mN/m]≥35. If the wet tension is less than 35 mN/m, a large amount of rolling oil remains on the copper foil surface, and the slurry cannot be uniformly wetted and spread on the copper foil surface, causing deterioration of the adhesion to the active material, which may not be preferable.

The rolled copper foil for a lithium ion battery current collector according to an embodiment of the present invention more preferably satisfies a wet tension [mN/m]≥39. The upper limit of the wet tension is not particularly limited. However, productivity may be deteriorated because more degreasing time is required to obtain the wettability of more than 70 mN/m.

The rolled copper foil for a lithium ion battery current collector according to an embodiment of the present invention where the relationship between the wet tension of the rolled copper foil and the thickness of BTA film as described above, and the wet tension and the thickness of BTA film are controlled can be constructed by controlling an irregularity state of the surface caused by the oil pits without performing any roughening treatment such as a polishing treatment and plating of electrodeposited grains. The oil pit refers to a fine depression in which the rolling oil contained in a roll bite by a rolling roll and a material to be rolled is partially generated on the surface of the material to be rolled. Since the roughening treatment is omitted, there is an advantage that economic efficiency and productivity are improved.

A shape of the oil pit on the rolled copper foil, i.e., a surface texture, is controlled by adjusting a surface roughness of the rolling roll, a rolling speed, a viscosity of the rolling oil, a reduction rate per a pass (especially a reduction rate of a final pass), and the like. For example, the surface roughness of the rolled copper foil obtained by using a rolling mill roll having a higher surface roughness tends to be increased, and conversely, the surface roughness of the rolled copper foil obtained by using a rolling mill roll having a lower surface roughness tends to be decreased. Further, the amount of oil pits generated tends to be increased by increasing the rolling speed, increasing the viscosity of the rolling oil, or decreasing the reduction rate per a pass. On the contrary, the amount of oil pits generated tends to be decreased by decreasing the rolling speed, decreasing the viscosity of the rolling oil, or increasing the rolling reduction rate per a pass.

Figure 2:
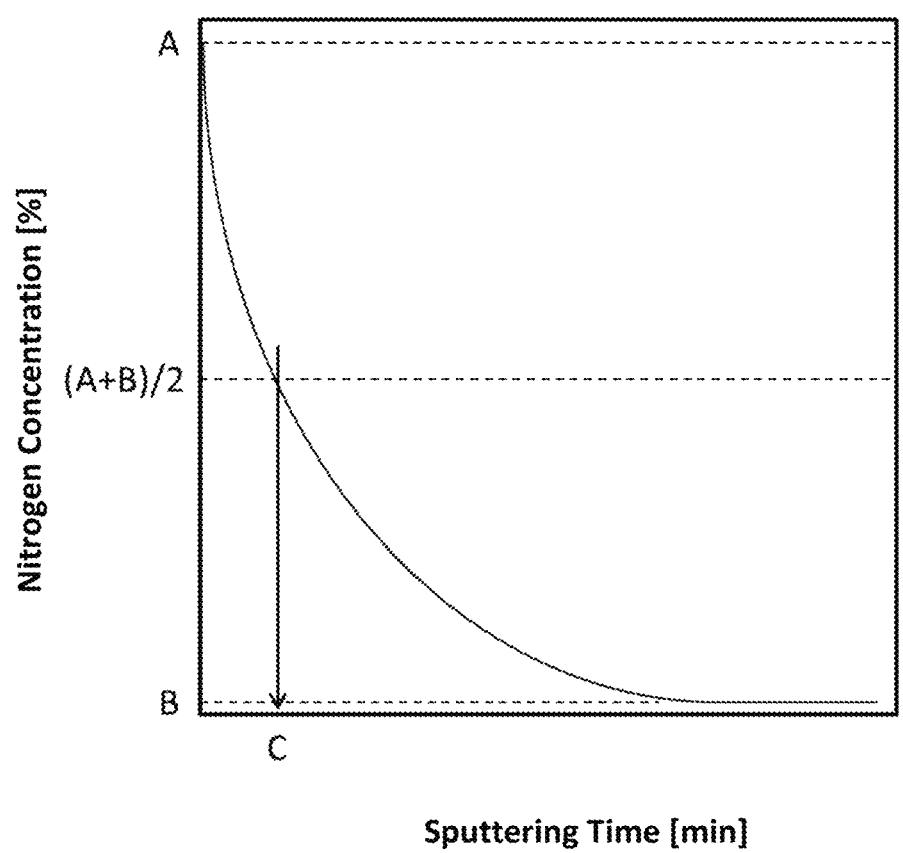
FIG. 2 is a graph schematically showing a nitrogen profile of a surface layer, obtained by XPS analysis.

In the present embodiment, when measuring the thickness of the BTA film, argon sputtering is combined with an X-ray photoelectron spectroscopic analyzer (XPS apparatus) to perform elemental analysis in the depth direction, and a sputtering time when a nitrogen concentration is an intermediate value between the maximum value on the surface and a value on a non-BTA coated portion is determined, and this time is regarded as a time required for sputtering the BTA film. The thickness of the BTA film is obtained by multiplying the above time by a sputtering rate (converted to $SiO_2$). For example, as shown in FIG. 2, when the maximum value of the nitrogen concentration is A (%) and the nitrogen concentration of the non-BTA coated portion is B (%), the intermediate value will be (A+B)/2(%). The thickness of the BTA film is C×D (nm), in which C (min) is the sputtering time when the nitrogen concentration is (A+B)/2(%), and D (nm/min) is the sputtering rate (converted to $SiO_2$).

(Lithium Ion Battery)

A lithium ion battery can be produced by a conventional means using a negative electrode comprised of a current collector made of the rolled copper foil according to the present invention and an active material layer formed on the current collector. The lithium ion battery includes lithium ion primary batteries and lithium ion secondary batteries in which lithium ions in the electrolyte are responsible for electrical conduction. Non-limiting examples of the negative electrode active material include carbon, silicon, tin, germanium, lead, antimony, aluminum, indium, lithium, tin oxide, lithium titanate, lithium nitride, tin oxide obtained by solid solution of indium, indium-tin alloys, lithium-aluminum alloys, and lithium-indium alloys.

(Production Method)

The rolled copper foil for a lithium ion battery current collector according to the embodiment of the present invention can be produced by, for example, the following production method. First, an ingot as a raw material is produced and rolled by hot rolling. Annealing and cold rolling are then repeated, and in the final cold rolling, the rolled product is finished into a thickness of 1 to 100 µm under conditions where a work roll diameter is from 50 to 100 mm, a surface roughness Ra of the work roll is from 0.03 to 0.1 µm, and a rolling speed of the final pass is from 300 to 500 m/min. The viscosity of the rolling oil can be from 3.0 to 5.0 cSt (25° C.). An oil such as a rolling oil used in the final cold rolling adheres to the copper foil after the final cold rolling. Therefore, the copper foil is washed with a solution containing a petroleum-based solvent and an anionic surfactant to remove copper fine powder, the rolling oil and the like adhering to the surface of the copper foil, and then dried by air blowing to subject the copper foil to a rust prevention treatment using a BTA solution.

As the method for removing the rolling oil and the like from the surface of the copper foil, a conventionally known degreasing treatment or washing treatment can be used. Examples of an organic solvent (degreasing solvent) to be used include normal paraffin, alcohols such as isopropyl alcohol, acetone, dimethylacetamide, tetrahydrofuran and ethylene glycol.

An immersion time of the copper foil in the degreasing solvent in the degreasing treatment or the washing treatment, and the oxide film removing treatment may be 2.5 seconds or more. On the other hand, if the immersion time is too long, the productivity is deteriorated, and the surface of the copper foil may be discolored due to alkali discoloration. A copper foil having a larger Ra, i.e., a copper foil having many or deeper oil pits, preferably has a longer immersion time in order to remove the rolling oil that has entered the oil pits and the oxide film formed on the surface of the copper foil. The immersion time of the copper foil in the degreasing solvent may be from 2.5 to 12 seconds, and more preferably from 2.5 to 8.5 seconds.

In the production steps of the copper foil, the oxide film is formed on the surface of the copper foil. The presence of the oxide film on the surface of the copper foil decreases the wet tension of the copper foil. Therefore, it is desirable to remove the oxide film on the surface of the copper foil.

The rust prevention treatment is controlled to satisfy the thickness of the BTA film on the copper foil surface of 0.6 nm or more and 4.6 nm or less, and the relational expression between the thickness of the BTA film on the copper foil surface and the wet tension (40j≤wet tension [mN/m]+ thickness of BTA film [nm]×10≤80). If the thickness of the BTA film is less than 0.6 nm, the rust prevention property is insufficient, and if it is more than 4.6 nm, the ultrasonic weldability is deteriorated, and an increased amount of metal powder is generated during ultrasonic welding. A temperature of the BTA solution when forming the BTA film on the copper foil surface is preferably from 35 to 55° C. This is because the temperature less than 35° C. does not lead to the BTA film having density sufficient to maintain the rust preventive function, and the temperature more than 55° C. may lead to excessively high density of the BTA film. Further, conditions such as a concentration of the BTA solution to be applied to the copper foil, a temperature and pH of the solution, and an immersion time of the copper foil, and the like, may be appropriately determined in relation to the thickness of the BTA film to be formed. It should be noted that the immersion time may generally be from about 0.5 to 30 seconds.

The immersion time of the copper foil in the BTA solution is preferably from 4.5 to 27 seconds, and more preferably from 7.0 to 27 seconds, and further preferably from 15 to 26.5 seconds.

EXAMPLES

Examples of the present invention will be described below. These are provided for better understanding of the present invention, and are not intended to limit the present invention.

Examples 1 to 9, Comparative Examples 1 to 7

[Production of Rolled Copper Foil]

A tough pitch copper ingot having a width of 600 mm was produced and rolled by hot rolling. Annealing and cold rolling were then repeated, and finally finished into a thickness of 0.01 mm by cold rolling under conditions of a work roll diameter of 60 mm, a surface roughness Ra of the work roll of 0.03 μm, and a rolling speed of 400 m/min in the final pass. The viscosity of the rolling oil was 4.0 cSt (25° C.). In this state, an oil such as the rolling oil used in the final cold rolling adheres to the copper foil. The copper foil was washed with a solution containing a petroleum-based solvent and an anionic surfactant to remove fine copper powder, the rolling oil and the like adhering to the surface of the copper foil, and then dried by air blowing to subject the copper foil to the rust prevention treatment using a BTA solution.

The rolling oil on the surface of the copper foil was removed by a degreasing treatment using normal paraffin as an organic solvent (degreasing solvent).

In the rust prevention treatment using the BTA solution, the dried copper foil was immersed in a BTA solution having a concentration of 0.02%, a solution temperature of 45° C., and a pH of 6.5 to 8.0 for the immersion time as shown in Table 1.

[Arithmetic Average Roughness Ra]

The arithmetic average roughness Ra was measured according to JIS B 0601: 2001, and was a value obtained by measuring a surface of a sample with a length of 175 μm in the rolling parallel direction using a confocal microscope (from Lasertec corporation, model number: HD 100D).

[Thickness of BTA Film]

The thickness of the BTA film was obtained by elementally analyzing the copper foil in the depth direction with an XPS device while being sputtered in argon, and determining a sputtering time when the nitrogen concentration was an intermediate value between the maximum value on the surface and the value on the non-BTA coated portion, and regarding this time as a time required for sputtering the BTA film, and multiplying the sputtering time by a sputtering rate (converted to $SiO_2$). An average value obtained from any five positions by the above method was determined to be an average value of thicknesses of the BTA film.

Device: XPS device (ULVAC-PHI, model PHI5000 Versa Probe II);

Vacuum degree: $8.2 \times 10^{-8}$ Pa;

X-ray: monochromatic AIKα, X-ray output of 25.0 W, an incident angle of 90°, an extraction angle of 45°; and Ion beam: Ion species of $Ar^+$, an acceleration voltage of 2 kV, a sweep area of 3 mm×3 mm, a sputtering rate of 2.4 nm/min (converted to $SiO_2$).

[Adhesion to Active Material]

Adhesion to the active material was evaluated by the following procedure:

(1) Artificial graphite having an average diameter of 9 μm and polyvinylidene chloride were mixed at a weight ratio of 1:9, and this was dispersed in a solvent N-methyl-2-pyrrolidone.

(2) The surface of the copper foil was coated with the above active material.

(3) The copper foil coated with the active material was heated in a dryer at 90° C. for 30 minutes.

(4) After drying, the copper foil was cut into 20 mm squares and subjected to a load of 1.5 tons/mm² for 20 seconds.

(5) Cuts in a grid pattern were formed on the above sample with a cutter, a commercially available adhesive tape (CELLOTAPE®) was attached, and a roller having a weight of 2 kg was placed thereon and reciprocated once to attach the adhesive tape under pressure.

(6) The adhesive tape was peeled off, and an image of the surface of the active material remaining on the copper foil was captured in a PC, and a metallic luster part on the copper surface and a black part where the active material remained were distinguished by binarization to calculate a residual rate of the active material. The residual rate was an average value of three samples. For the evaluation of the adhesion to the active material, a residual rate of less than 50% was determined to be "x", and a residual rate of 50% or more was determined to be "○".

[Rust Prevention Property]

(1) The copper foil was cut out into a size of 50 mm×100 mm, and the three copper foils were stacked and fixed with an adhesive tap, placed in a vinyl bag, and sealed with a tape while removing the air therein.

(2) A sample (1) was placed in a wet tester (50° C.×90% RH) and maintained for 168 hours.

(3) The sample (1) was taken out from the tester described in (2), and a color tone of the surface of a portion where the copper foils overlapped was confirmed.

(4) The sample where the color tone of the copper foil surface after the test was the same as that before the test was evaluated as "⊚", the sample that was slightly discolored as compared with that before the test was evaluated as "○", and the sample that was discolored into light reddish brown color was devaluated as "Δ", and the sample where the entire surface was discolored into reddish black color was evaluated as "x". The copper foil that was discolored into reddish black color had a thicker oxide film and was not suitable for battery applications.

[Wet Tension]

The wet tension was measured according to JIS K 6768 using a wet tension test mixed solution (from Wako Pure Chemical Industries, Ltd.).

[Ultrasonic Weldability]

(1) The copper foil was cut out into a size of 100 mm×150 mm, and 30 copper foils were stacked.

(2) A horn (a pitch of 0.8 mm, a height of 0.4 mm) was attached to an actuator (model number: Ultraweld L20E) from Branson. An anvil used a 0.2 mm pitch.

(3) Welding conditions were a pressure of 40 psi, an amplitude of 60 μm, a frequency of 20 kHz, and a welding time of 0.1 seconds.

(4) When the copper foils were peeled off one by one after welding under the above conditions, a case where 11 or more copper foils were broken at the welded part was evaluated as "○", and a case where 0 to 10 copper foils were broken at the welded part was evaluated as "x". Before peeling off the copper foils, the welded part of the copper foil on the outermost layer that was in contact with the horn was observed with a microscope at magnifications of 20 times, and confirming that no crack was generated. Subsequently, the peeling test was conducted.

[Number of Metal Powders Generated During Ultrasonic Welding]

The ultrasonic weldability was evaluated by the following procedure:

(1) The copper foil was cut out into a size of 100 mm×150 mm, and 30 copper foils were stacked.

(2) A horn (a pitch of 0.8 mm, a height of 0.4 mm) was attached to an actuator (model number: Ultraweld L20E) from Branson. An anvil used a 0.2 mm pitch.

(3) A tape having a width of 20 mm was attached to both sides of the anvil with the adhesive surface facing upward. The size of the adhesive surface was 20 mm×60 mm.

(4) Welding conditions were a pressure of 40 psi, an amplitude of 60 μm, a frequency of 20 kHz, and a welding time of 0.1 seconds.

(5) After the welding carried out 30 times while changing the welding part under the above conditions, the number of metal powders adhering to the adhesive surface of the tape attached to both sides of the anvil was counted.

Table 1 shows the evaluation conditions and evaluation results.

TABLE 1

| | Arithmetic Average Roughness Ra [μm] | Wetting Tension [mN/m] | Thickness of BTA Film [nm] | BTA Immersion Time [s] | Wet Tension [mN/m] + Thickness of BTA Film [nm]*10 | Active Material Adhesion | Rust Prevention | Ultrasonic Weldability | Number of Generated Metal Powder [Pieces] |
|---|---|---|---|---|---|---|---|---|---|
| Example 1 | 0.068 | 37 | 3.2 | 5.0 | 69.0 | ○ | Δ | ○ | 190 |
| Example 2 | 0.242 | 40 | 4.5 | 25.5 | 85.0 | ○ | ○ | ○ | 695 |
| Example 3 | 0.044 | 42 | 3.1 | 6.0 | 73.0 | ○ | Δ | ○ | 132 |
| Example 4 | 0.194 | 43 | 4.9 | 17.5 | 92.0 | ○ | ⊚ | ○ | 546 |
| Example 5 | 0.22 | 36 | 6.7 | 22.0 | 103.0 | ○ | ⊚ | ○ | 630 |
| Example 6 | 0.084 | 36 | 3.5 | 8.0 | 71.0 | ○ | ○ | ○ | 255 |
| Example 7 | 0.149 | 35 | 4 | 11.5 | 75.0 | ○ | ○ | ○ | 420 |
| Example 8 | 0.162 | 40 | 5 | 19.0 | 90.0 | ○ | ⊚ | ○ | 464 |
| Example 9 | 0.240 | 42 | 5.9 | 26.5 | 101.0 | ○ | ⊚ | ○ | 682 |
| Comparative Example 1 | 0.255 | 25.4 | 2.5 | 0.5 | 50.4 | X | X | ○ | 2562 |
| Comparative Example 2 | 0.076 | 37 | 2.9 | 4.0 | 66.0 | ○ | X | ○ | 682 |
| Comparative Example 3 | 0.203 | 25.4 | 3.6 | 8.5 | 61.4 | X | ⊚ | X | 695 |
| Comparative Example 4 | 0.269 | 37 | 7.1 | 35.0 | 108.0 | ○ | ○ | X | 2884 |
| Comparative Example 5 | 0.101 | 34 | 3.4 | 7.0 | 68.0 | X | ○ | ○ | 275 |
| Comparative Example 6 | 0.0095 | 45 | 6.1 | 28.0 | 106.0 | X | ○ | ○ | 751 |
| Comparative Example 7 | 0.230 | 34 | 5.1 | 20.5 | 85.0 | X | ○ | ○ | 666 |

Examples 1 to 9 satisfied 40≤wet tension [mN/m]+thickness of BTA film [nm]×10≤80; 0.01≤arithmetic average roughness Ra≤0.25; wet tension [mN/M]≥35; and 0.6≤thickness of BTA film [nm]≤4.6. Therefore, the adhesion to the active material, the rust preventive property, and the ultrasonic weldability were better, and the number of generated metal powders was lower.

In Comparative Example 1, the wet tension was lower than 35 mN/m, the wet tension [mN/m]+thickness of BTA film [nm]×10 was less than 40, and the arithmetic average roughness Ra was more than 0.25 μm. Therefore, the adhesion to the active material was poor, and the number of generated metal powders was significantly higher than that of the copper foil satisfying 0.01≤arithmetic average roughness Ra [μm]≤0.25. Moreover, since the thickness of the BTA film was lower, which was less than 0.6 nm, the rust prevention property was poor.

In Comparative Example 2, since the thickness of the BTA film was lower, which was less than 0.6 nm, the rust prevention property was poor.

In Comparative Example 3, the wet tension was lower than 35 mN/m, and the wet tension [mN/m]+thickness of BTA film [nm]×10 was less than 40. Therefore, the adhesion to the active material was poor, and the ultrasonic weldability was poor.

In Comparative Example 4, the arithmetic average roughness Ra was more than 0.25 μm. Therefore, the number of generated metal powders was significantly higher than that of the copper foil satisfying 0.01≤arithmetic average roughness Ra [μm]≤0.25. Moreover, since the thickness of the BTA film was higher than 4.6 nm, the ultrasonic weldability was poor.

In Comparative Examples 5 and 7, the wet tension was lower than 35 mN/m. Therefore, the adhesion to the active material was poor.

In Comparative Example 6, the arithmetic average roughness Ra was less than 0.01 μm. Therefore, the anchor effect was reduced and the adhesion to the active material was poor.

Figure 3:
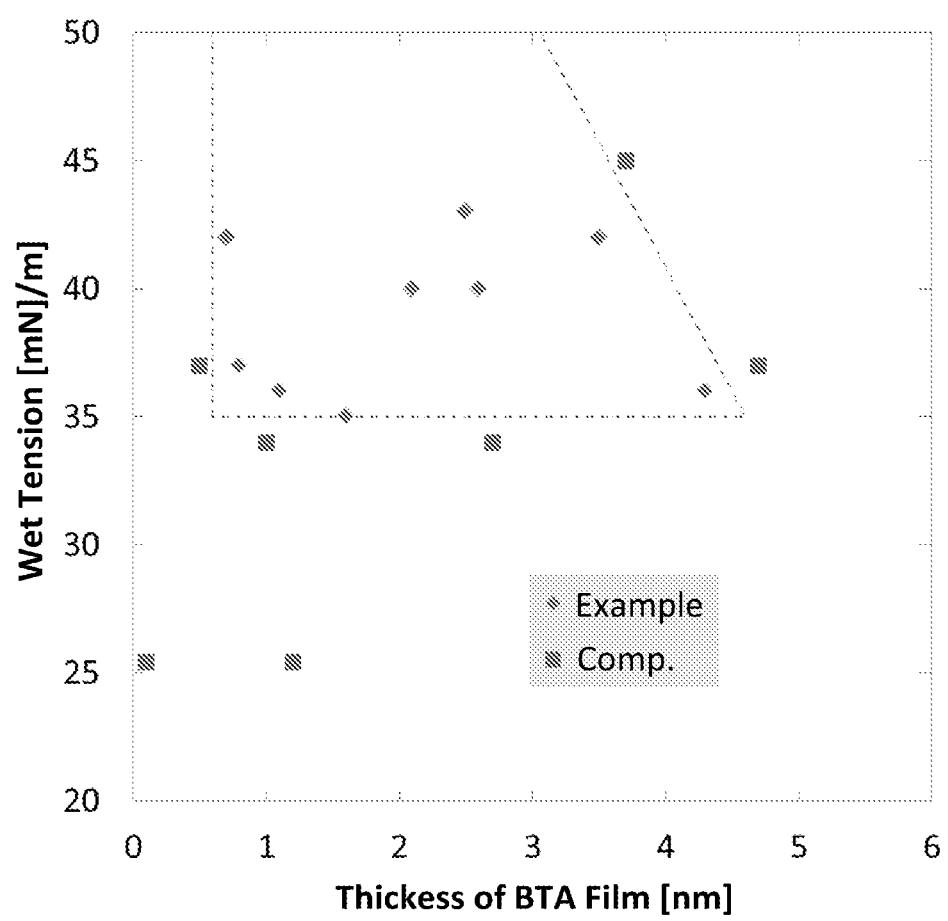
FIG. 3 is a graph showing a relationship between a wet tension and a thickness of a BTA film in each of Example and Comparative Example.

FIG. 3 shows a graph showing the relationship between the wet tension and the thickness of the BTA film in Examples 1 to 9. All of Examples 1 to 9 that satisfied the relationships: 40≤wet tension [mN/m]+thickness of BTA film [nm]×10≤80; 0.01≤arithmetic average roughness Ra [μm]≤0.25; wet tension [mN/m]≥35; and 0.6≤thickness of BTA film [nm]≤4.6 had good ultrasonic weldability and had a decreased number of generated metal powders.

DESCRIPTION OF REFERENCE NUMERALS 11 positive electrode
12 separator
13 negative electrode
14, 15 tab

The invention claimed is:

1. A rolled copper foil for a lithium ion battery current collector, wherein a surface of the copper foil has a benzotriazole film, the benzotriazole film has a thickness of 0.6 nm or more and 4.6 nm or less, and wherein the rolled copper foil satisfies the following relationships:
   40≤wet tension [mN/m]+thickness of benzotriazole film [nm]×10≤80;
   0.01≤arithmetic average roughness Ra [μm]≤0.25; and
   wet tension [mN/m]≥35.

2. The rolled copper foil for a lithium ion battery current collector according to claim 1, wherein the rolled copper foil satisfies:
   45≤wet tension [mN/m]+thickness of benzotriazole film [nm]×10≤75; and
   wet tension [mN/m]≥39.

3. The rolled copper foil for a lithium ion battery current collector according to claim 1, wherein the rolled copper foil satisfies an arithmetic average roughness Ra [μm]≥0.03.

4. The rolled copper foil for a lithium ion battery current collector according to claim 1, wherein the rolled copper foil is for a negative electrode current collector of a lithium ion secondary battery.

5. A lithium ion battery comprising the rolled copper foil for a lithium ion battery current collector according to claim 1.

6. The rolled copper foil for a lithium ion battery current collector according to claim 2, wherein the rolled copper foil satisfies an arithmetic average roughness Ra [μm]≥0.03.

7. The rolled copper foil for a lithium ion battery current collector according to claim 2, wherein the rolled copper foil is for a negative electrode current collector of a lithium ion secondary battery.

8. The rolled copper foil for a lithium ion battery current collector according to claim 3, wherein the rolled copper foil is for a negative electrode current collector of a lithium ion secondary battery.

9. The rolled copper foil for a lithium ion battery current collector according to claim 4, wherein the rolled copper foil is for a negative electrode current collector of a lithium ion secondary battery.

10. The rolled copper foil according to claim 1, wherein the thickness of the benzotriazole film is 2.1 nm or more and 4.6 nm or less.

* * * * *